United States Patent
Li et al.

(10) Patent No.: US 10,230,316 B2
(45) Date of Patent: Mar. 12, 2019

(54) MOTOR DRIVING DEVICE AND APPLICATION APPARATUS

(71) Applicant: Johnson Electric S.A., Murten (CH)

(72) Inventors: Yue Li, Hong Kong (CN); Chiping Sun, Hong Kong (CN); Fei Xin, Shen Zhen (CN); Shinghin Yeung, Hong Kong (CN); Xiuwen Yang, Shen Zhen (CN); Shujuan Huang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/817,967

(22) Filed: Nov. 20, 2017

(65) Prior Publication Data
US 2018/0145614 A1    May 24, 2018

(30) Foreign Application Priority Data

Nov. 21, 2016 (CN) .......................... 2016 1 1041772

(51) Int. Cl.
| | | |
|---|---|---|
| H02P 6/14 | (2016.01) | |
| H02P 5/74 | (2006.01) | |
| H02P 25/03 | (2016.01) | |

(52) U.S. Cl.
CPC ............... *H02P 5/74* (2013.01); *H02P 25/03* (2016.02)

(58) Field of Classification Search
CPC ........................................................ H02P 5/74
USPC ..................................................... 318/400.26
See application file for complete search history.

(56) References Cited

U.S. PATENT DOCUMENTS

| | | | | |
|---|---|---|---|---|
| 5,321,343 A | * | 6/1994 | Kane, Jr. .................. | H02P 5/68 318/400.01 |
| 2004/0012350 A1 | * | 1/2004 | Weinmann ................ | H02P 5/74 318/110 |
| 2013/0073125 A1 | * | 3/2013 | Araki ........................ | B60L 7/14 701/19 |
| 2017/0179855 A1 | * | 6/2017 | Cho .......................... | H02P 5/46 |

\* cited by examiner

*Primary Examiner* — Erick Glass
(74) *Attorney, Agent, or Firm* — Muncy, Geissler, Olds & Lowe, P.C.

(57) ABSTRACT

A motor driving device for brushless direct current motors and an application apparatus thereof are provided. The motor driving device includes an inverter, a plurality of motor branches, and a microprocessor. The inverter includes a plurality of semiconductor switches to output an alternating current power via a first output terminal and a second output terminal. The plurality of motor branches are connected in parallel between the first output terminal and the second output terminal of the inverter, and each of the plurality of motor branches comprising a motor and a controllable bidirectional alternating current switch connected in series. The microprocessor controls a conduction manner of the semiconductor switches in the inverter, and whether to turn of the controllable bidirectional alternating current switch in each of the plurality of motor branches.

20 Claims, 9 Drawing Sheets

MOTOR DRIVING DEVICE AND APPLICATION APPARATUS

CROSS REFERENCE TO RELATED APPLICATIONS

This non-provisional patent application claims priority under 35 U.S.C. § 119(a) from Patent Application No. 201611041772.5 filed in the People's Republic of China on Nov. 21, 2016.

TECHNICAL FIELD

The present disclosure relates to a motor driving device, and in particular to a motor driving device capable of controlling multiple motors.

BACKGROUND

Multiple brushless direct current motors (BLDC) can be applied in one device, such as a seating adjustment system in a vehicle which includes a plurality of motors to adjust a longitudinal position, a seat height, a backrest height, a thigh support, a lumbar support. If each of the brushless direct current motors is provided with one drive circuit, and each drive circuit includes at least one inverter formed by four semiconductor switches, so a large number of electronic elements are needed to arrange in the system. Thus, a structure of the drive circuit is complicated and has a big size and a high cost.

SUMMARY

In view of this, a motor driving device with a low cost and an application apparatus including the motor driving device are provided according to an embodiment of the present disclosure.

A motor driving device includes an inverter, a plurality of motor branches, and a microprocessor. The inverter includes a plurality of semiconductor switches to output an alternating current power via a first output terminal and a second output terminal. The plurality of motor branches are connected in parallel between the first output terminal and the second output terminal of the inverter, and each of the plurality of motor branches comprising a motor and a controllable bidirectional alternating current switch connected in series. The microprocessor controls a conduction manner of the semiconductor switches in the inverter, and whether to turn of the controllable bidirectional alternating current switch in each of the plurality of motor branches. Preferably, the inverter is a bridge inverter, and intermediate nodes of two single-phase bridge arms of the inverter serve as the first output terminal and the second output terminal of the inverter, respectively.

Preferably, each of the motor branches further comprises a switch control circuit, the switch control circuit receives a selection signal outputted by the microprocessor and used to control whether to turn on the controllable bidirectional alternating current switch.

Preferably, when the controllable bidirectional alternating current switch is turned on, the switch control circuit switches between at least a first state and a second state; and in the first state, a current flows from the first output terminal of the inverter to a control end of the controllable bidirectional alternating current switch through the switch control circuit, and then is grounded via the second output terminal and a turned-on lower arm semiconductor switch connected to the second output terminal in the inverter, and in the second state, a current flows from the second output terminal to the first output terminal of the inverter, through a control end of the bidirectional alternating current switch and the switch control circuit, and then is grounded via a turned-on lower arm semiconductor switch connected to the first output terminal in the inverter.

Preferably, the switch control circuit comprises a first switch and a second switch; and the first switch and the second switch are connected in parallel between the control end of the controllable bidirectional alternating current switch and the first output terminal of the inverter; when the first switch is turned on, a current flows from the first output terminal of the inverter to the control end of the controllable bidirectional alternating current switch through the first switch; and when the second switch is turned on, a current flows from the control end of the controllable bidirectional alternating current switch to the first output terminal of the inverter through the second switch.

Preferably, the switch control circuit comprises an optical isolation bidirectional trigger diode, the optical isolation bidirectional trigger diode comprises a light-emitting diode and a bidirectional trigger diode, an anode of the light-emitting diode is connected to a power supply, a cathode of the light-emitting diode is grounded via a control switch, two anodes of the bidirectional trigger diode are connected to the first output terminal of the inverter and the control end of the controllable bidirectional alternating current switch respectively, and the control switch receives a selection signal to control whether to turn on the controllable bidirectional alternating current switch in each of the motor branches.

Preferably, each of the motor branches further comprises a switch control circuit, the switch control circuit comprises a light-emitting diode, the controllable bidirectional alternating current switch is a bidirectional trigger diode, an anode of the light-emitting diode receives a selection signal for controlling whether to turn on the controllable bidirectional alternating current switch in each of the motor branches, a cathode of the light-emitting diode is grounded, and the light-emitting diode and the bidirectional trigger diode form an optical isolation bidirectional trigger diode.

Preferably, each of the motor branches further comprises a switch control circuit, the switch control circuit comprises a resistor and a control switch connected in series between a control end of the controllable bidirectional alternating current switch and the ground, the second output terminal is further connected to a power supply used to provide a gate drive current to the controllable bidirectional alternating current switch, and a selection signal is sent to the control switch to control whether to turn on the controllable bidirectional alternating current switch in each of the motor branches.

Preferably, each of the motor branches further comprises a switch control circuit, the switch control circuit comprises a light-emitting diode, the controllable bidirectional alternating current switch is a bidirectional trigger diode, an anode of the light-emitting diode receives a selection signal for controlling whether to turn on the controllable bidirectional alternating current switch in each of the motor branches, a cathode of the light-emitting diode is grounded, and the light-emitting diode and the bidirectional trigger diode form an optical isolation bidirectional trigger diode.

Preferably, each of the motor branches further comprises a switch control circuit, the switch control circuit comprises a resistor and a control switch connected in series between a control end of the controllable bidirectional alternating current switch and the ground, the second output terminal is further connected to a power supply used to provide a gate drive current to the controllable bidirectional alternating current switch, and a selection signal is sent to the control switch to control whether to turn on the controllable bidirectional alternating current switch in each of the motor branches.

Preferably, each of the motor branches further comprises a switch control circuit, the switch control circuit comprises a resistor and a signal buffer, an input end of the signal buffer receives a selection signal outputted by the microprocessor and the controllable bidirectional alternating current switch is controlled whether to turn on by the selection signal in each of the motor branches, the second output terminal is further connected to a power supply used to provide a gate drive current to the controllable bidirectional alternating current switch, and an output end of the signal buffer is connected to a control end of the controllable bidirectional alternating current switch via the resistor.

Preferably, the controllable bidirectional alternating current switch is a TRIAC, anti-parallel IGBTs, GTRs, MOSs, GTOs or triodes, or a bidirectional silicon triode thyristor.

An application apparatus includes the motor driving device as described-above.

Preferably, the application apparatus can be a dish-washing machine, a dry washer, or a vehicle seat.

In the above motor driving device, the multiple motors share one inverter, the number of the semiconductor switches in the motor driving device is greatly decreased, and a size of a printed circuit board component where the semiconductor switches are mounted in the motor driving device is also greatly decreased, thereby reducing costs of both the motor driving device and the application apparatus.

DETAILED DESCRIPTION OF THE EMBODIMENTS

Hereinafter, specific embodiments of the present disclosure are described in detail in conjunction with drawings, which makes technical solutions and other beneficial effects of the present disclosure apparent. It should be understood that, the drawings are provided only for reference and illustration, not to limit the present disclosure. Dimensions shown in the drawings are only for ease of clear descriptions, but not limited to a proportional relationship.

Figure 1:
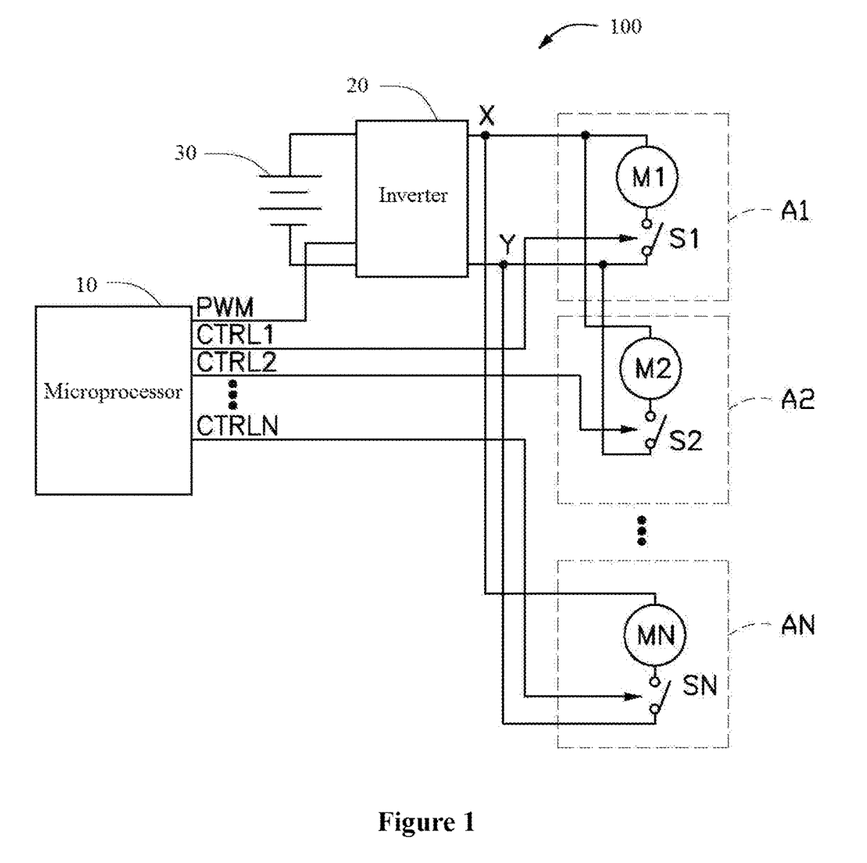
FIG. 1 shows a principle diagram of a motor driving device according to one embodiment.

FIG. 1 shows a motor driving device 100 according to one embodiment. The motor driving device 100 can include a microprocessor 10, an inverter 20, and a plurality of motor branches A1 to AN connected in parallel between a first output terminal X and a second output terminal Y of the inverter 20. The inverter 20 can include multiple semiconductor switches which are configured to convert a voltage of a power supply 30 into an alternating current. The inverter 20 can output the alternating current via the first output terminal X and the second output terminal Y of the inverter 20. Each of the plurality of motor branches A1 to AN can include a plurality of motors M1 to MN and a plurality of controllable bidirectional alternating current switches S1 to SN. Each of the plurality of motors M1 to MN is connected to one controllable bidirectional alternating current switch in series. The microprocessor 10 is configured to send a PMW signal to the inverter 20 to control a conduction manner of the semiconductor switches in the inverter 20, and send selection signals CTRL1 to CTRLN to the motor branches A1 to AN to control whether to turn on the controllable bidirectional alternating current switches S1 to SN in the motor branches A1 to AN, respectively. Accordingly, an operation state of each of the motors M1 to MN in the motor driving device 100 can be controlled. The controllable bidirectional alternating current switch may be a TRIode AC semiconductor switch (TRIAC), or anti-parallel IGBTs, GTRs, MOSs, GTOs or triodes.

Figure 2:
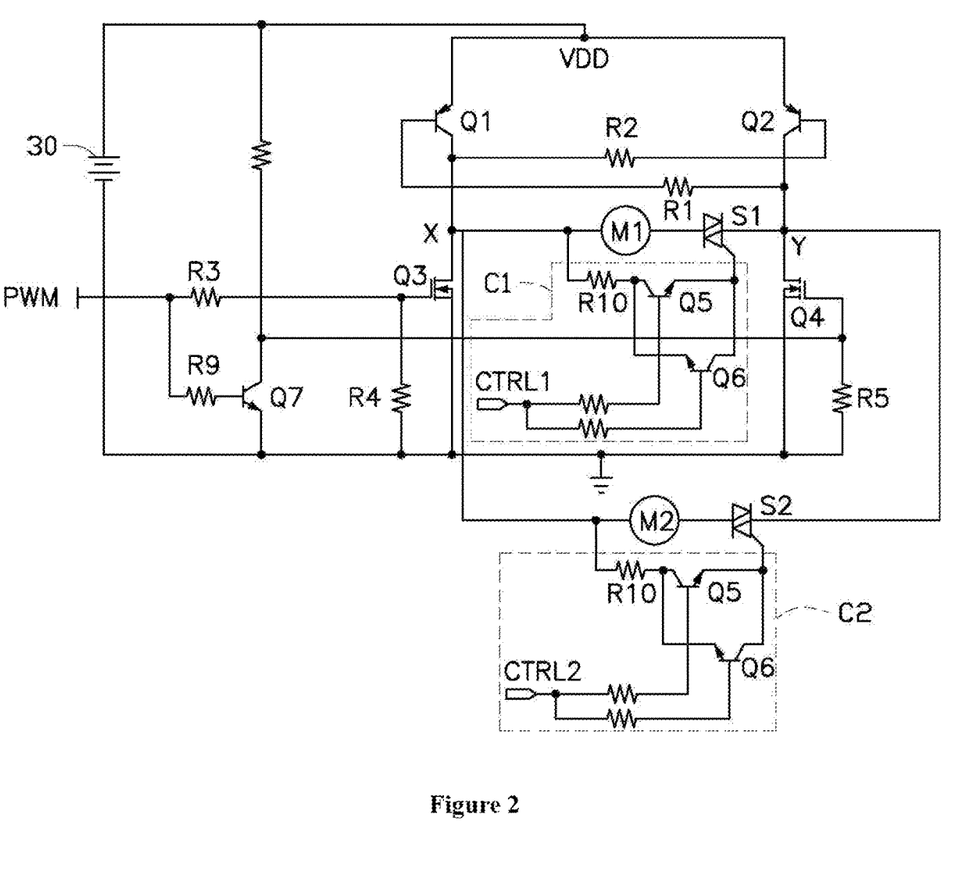
FIG. 2 shows circuit diagram of a motor driving device according to one embodiment.

FIG. 2 shows a circuit diagram of a motor driving device according to one embodiment. To facilitate description, it is taken as an example for description in the embodiment that a number of the motor branches is 2.

The inverter 20 may be a bridge inverter, namely, a full bridge inverter or an H-bridge inverter. The inverter 20 can include four semiconductor switches, which are a triode Q1, a triode Q2, a MOS transistor Q3, and a MOS transistor Q4. The four semiconductor switches form two bridge arms, where the triode Q1 and the MOS transistor Q3 form a first bridge arm, the triode Q2 and the MOS transistor Q4 form a second bridge arm, the triode Q1 and the triode Q2 are upper arm switches, and the MOS transistor Q3 and the MOS transistor Q4 are lower arm switches. An emitter of the triode Q and an emitter of the triode Q2 are connected to a positive electrode of the power supply 30, and a collector of the triode Q1 is connected to a drain of the MOS transistor Q3. A collector of the triode Q2 is connected to a drain of the MOS transistor Q4, and sources of the MOS transistors Q3 and Q4 are connected to a negative electrode of the power supply 30 and are grounded. A base of the triode Q1 is connected to the collector of the triode Q2 via a resistor R1. A base of the triode Q2 is connected to the collector of the triode Q1 via a resistor R2. A node where the collector of the triode Q1 and the MOS transistor Q3 are connected serves as the first output terminal X of the inverter 20, and a node where the collector of the triode Q2 and the MOS transistor Q4 are connected serves as the second output terminal Y of the inverter 20. Gates of the MOS transistors Q3 and Q4 are grounded via resistors R4 and R5, respectively. The gate of the MOS transistor Q3 receives the PWM signal outputted by the microprocessor 10 via a resistor R3, and the gate of the MOS transistor Q4 receives a $\overline{PWM}$ signal having an inverted phase with respect to the PWM signal outputted by the microprocessor 10. The $\overline{PWM}$ signal may be obtained by inverting the PWM signal via an inverter or a NOT gate. In the embodiment, the PWM signal is inverted by a triode Q7, where a base of the triode Q7 receives the PWM signal via a resistor R9, a collector of the triode Q7 is connected to the positive electrode of the power supply 30, an emitter of the triode Q7 is grounded, and a collector of the triode Q7 outputs the PWM signal.

In the embodiment, the triodes Q1 and Q2 are turned on with a low level signal, such as a PNP triode, and may also be a P-channel metallic oxide semiconductor field effect transistor (PMOSFET) in other embodiments. The MOS transistors Q3 and Q4 are turned on with a high level signal, such as a N-channel metallic oxide semiconductor field effect transistors (NMOSFET), and may also be a triode, an insulated gate bipolar transistor (IGBT) with anti-parallel diodes, a gate-turn-off switch thyristor (GTO), or the like in other embodiments. In a specific application, an anti-parallel diode may be connected between two ends of each of the semiconductor switches. The anti-parallel diode is configured to form a discharge path to release a back electromotive force formed between two ends of the motor when a state of the semiconductor switch changes, so as to prevent the back electromotive force from damaging the semiconductor switch.

In the embodiment, an operation principle of the inverter 20 is as follows. When the PWM signal is at a high level, the MOS transistor Q3 is turned on, the MOS transistor Q4 is turned off, the drain of the MOS transistor Q3 is pulled to a low level and the triode Q2 is turned on, and the collector of the triode Q2 is pulled to a high level and the triode Q1 is turned off. Therefore, when the PWM signal is at a high level, the triode Q2 and the MOS transistor Q3 are turned on, the triode Q1 and the MOS transistor Q4 are turned off, and a current flows from the second output terminal Y to the first output terminal X. When the PWM signal is at a low level, the MOS transistor Q3 is turned off, the MOS transistor Q4 is turned on, the drain of the MOS transistor Q4 is pulled to a low level and the triode Q1 is turned on, and the collector of the triode Q1 is pulled to a high level and the triode Q2 is turned off. Therefore, when the PWM signal is at a low level, the triode Q1 and the MOS transistor Q4 are turned on, the triode Q2 and the MOS transistor Q3 are turned off and a current flows from the first output terminal X to the second output terminal Y. In the embodiment, the MOS transistors Q3 and Q4 are turned on alternately under a control of the PWM signal, and states of the triodes Q1 and Q2 are adjusted with changes in the states of the MOS transistors Q4 and Q3, respectively. In this way, the current flows through the multiple motor branches A1 to AN connected between the first output terminal X and the second output terminal Y in an alternating current manner to drive the motors M to MN in the N motor branches A1 to AN to operate.

Each of the motor branches A1 to AN has a same structure, and the motor branch A1 is taken as an example for illustration. The motor branch A1 can include the controllable bidirectional alternating current switch S1, the motor M1, and a switch control circuit C1. The motor M1 and the controllable bidirectional alternating current switch S1 are connected in series between the first output terminal X and the second output terminal Y. The switch control circuit C1 can include a first switch and a second switch. And the first switch and the second switch are connected in parallel between a control end of the controllable bidirectional alternating current switch S1 and the first output terminal X of the inverter 20. When the first switch is turned on, a current flows from the first output terminal X of the inverter 20 to the control end of the controllable bidirectional alternating current switch through the first switch, and then is grounded via the second output terminal Y and the turned-on MOS transistor Q4 in the inverter. When the second switch is turned on, a current flows from the control end of the controllable bidirectional alternating current switch to the first output terminal X of the inverter 20 through the second switch, and is grounded via the turned-on MOS transistor Q3 of the inverter 20.

In the embodiment, the first switch and the second switch are triodes Q5 and Q6 respectively, both the triodes Q5 and Q6 are NPN triodes. An emitter of the triode Q5 is connected to the control end of the controllable bidirectional alternating current switch S1, and a collector of the triode Q5 is connected to the first output terminal X of the inverter 20 via a resistor RIO. An emitter of the triode Q6 is connected to the collector of the triode Q5, and a collector of the triode Q6 is connected to the emitter of the triode Q5. Bases of the triodes Q5 and Q6 receive the selection signal CTRL1 sent by the microprocessor 10. The motor branch A2 has a same structure as the motor branch A1, and the motor branch A2 includes the controllable bidirectional alternating current switch S2, the motor M2, and the switch control circuit C2, bases of the triodes Q5 and Q6 in the switch control circuit C2 receive the selection signal CTRL2 sent by the microprocessor 10. In the embodiment, the controllable bidirectional alternating current switch is a TRIAC.

Figure 3:
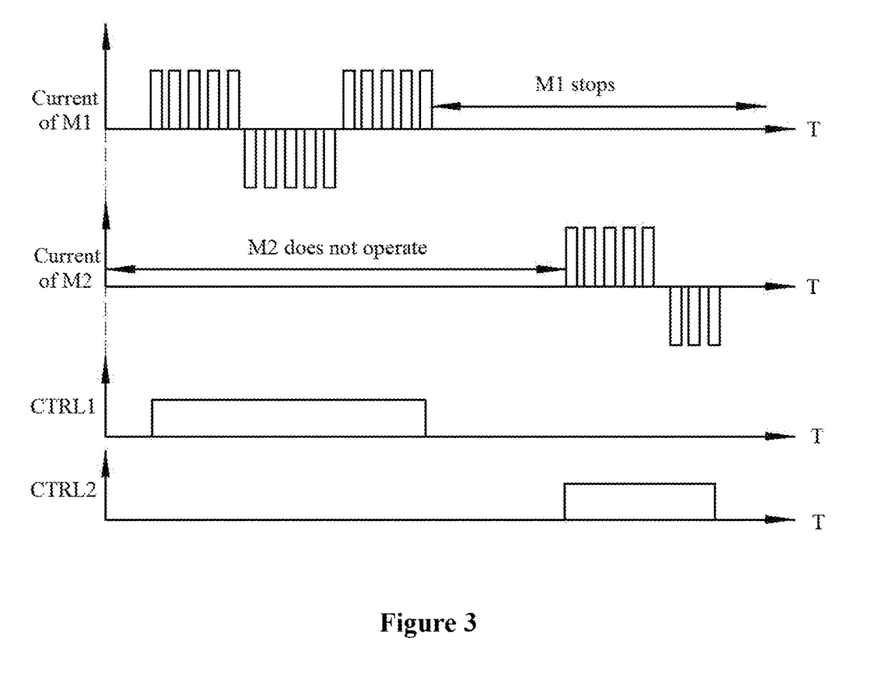
FIG. 3 shows current waveforms of two motors according to one embodiment.

When the motor M in the motor branch A1 is controlled to operate, the selection signal CTRL1 sent by the microprocessor 10 is at a high level, the triodes Q5 and Q6 in the switch control circuit C1 are turned on, the controllable bidirectional alternating current switch S1 is turned on, and the alternating current provided by the inverter 20 flows through the motor M1. When the motor M is controlled to stop, the selection signal CTRL1 is at a low level, the triodes Q5 and Q6 are turned off, the controllable bidirectional alternating current switch is turned off when a voltage flowing through the motor M1 reaches zero. When the motor M2 in the motor branch A2 is controlled to operate, the selection signal CTRL2 sent by the microprocessor 10 is at a high level, the triodes Q5 and Q6 in the switch control circuit C2 are turned on, the controllable bidirectional alternating current switch S2 is turned on, and the alternating current provided by the inverter 20 flows through the motor M2. The operation process may refer to waveforms of operation states of the motors as shown in FIG. 3. Generally, when a frequency of the PWM signal provided by the microprocessor 10 is higher than 20 KHz, the selection signals CTRL1 to CTRLN are in a manner of a sustained high level as shown in FIG. 3. When the frequency of the PWM signal is lower than 20 KHz, the selection signals CTRL1 to CTRLN are in a manner of a pulse train.

In the embodiment, the switch control circuit C1 includes two triodes Q5 and Q6, so that both positive half-period and negative half-period of the alternating current power supply can pass the controllable bidirectional alternating current switch S1. In another embodiment, when the switch control circuit C1 is only provided with one triode Q5 or Q6, the alternating current power supply provided by the inverter 20 can pass the selected motor for only a half period. Specifically, when the switch control circuit C1 is only provided with the triode Q5, only the negative half-period can pass the controllable bidirectional alternating current switch S1. When the switch control circuit C1 is only provided with the triode Q6, only the positive half-period can pass the controllable bidirectional alternating current switch S1.

It should be understood that, the motors in the motor branches can be controlled by controlling the selection signals CTRL1 to CTRLN provided by the microprocessor 10 to the motor branches A1 to AN. Apparently, all the motors may operate simultaneously or stop simultaneously, and the motors can operate at different time based on demands. Because all the motors share one inverter 20, the motors operating simultaneously have the same rotation speed. Apparently, the rotation speed of the motor can be adjusted by adjusting a duty ratio of the PWM signal provided to the inverter 20.

In other embodiments of the present disclosure, the inverter 20 and the motor branches A1 to AN of the motor driving device 100 may further have other structures.

Figure 4:
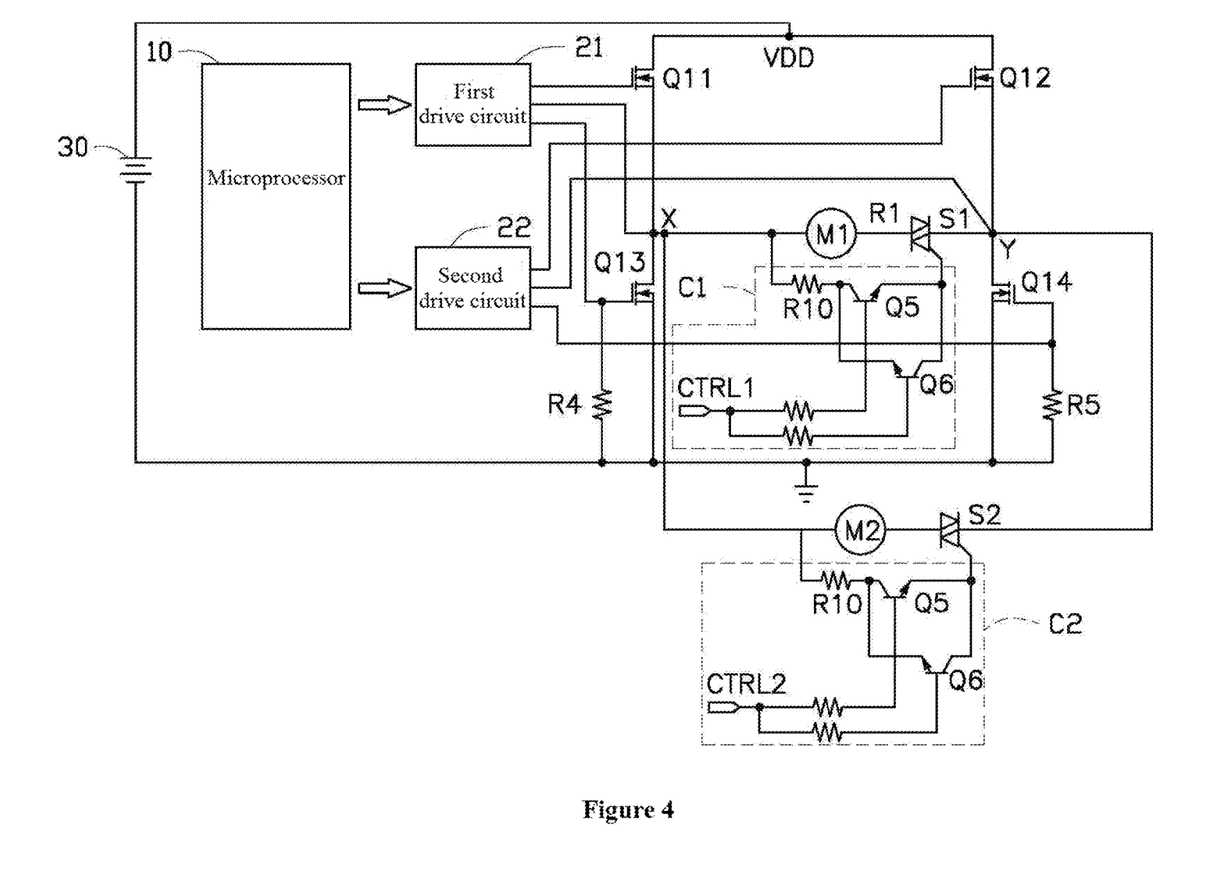
FIG. 4 shows circuit diagram of a motor driving device according to another embodiment.

FIG. 4 shows a circuit diagram of a motor driving device according to another embodiment. The motor branches shown in FIG. 4 have the same structures as the motor branches shown in FIG. 2. The motor driving device shown in FIG. 4 differs from the motor driving device shown in FIG. 2 in that, the inverter 20 in FIG. 4 is a bridge circuit mainly including four MOS transistors Q11 to Q14. The MOS transistors Q11 and Q13 form a first bridge arm, the MOS transistors Q12 and Q14 form a second bridge arm. The MOS transistors Q11 and Q12 are upper arm switches, and the MOS transistors Q13 and Q14 are lower arm switches. The microprocessor 10 sends a PWM signal to drive the MOS transistors Q11 and Q13 by a first drive circuit 21, and sends the PWM signal to drive the MOS transistors Q12 and Q14 by a second drive circuit 22. All the MOS transistors Q11 to Q14 are turned on with a high level signal, such as N-channel field effect transistors. The microprocessor 10 sends the PWM signal to control a group of the MOS transistors Q11 and Q14 and a group of the MOS transistors Q12 and Q13 to be turned on alternately, to supply the alternating current between the first output terminal X and the second output terminal Y.

Figure 5:
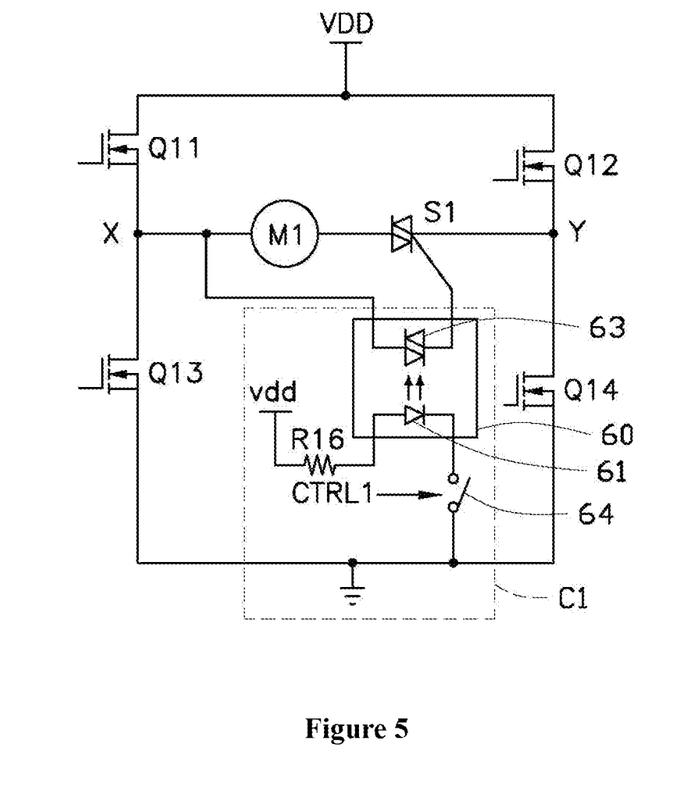
FIG. 5 shows circuit diagram of a motor driving device according to another embodiment.

FIG. 5 shows a circuit diagram of a motor driving device according to another embodiment. The motor driving device of FIG. 5 can include the same microprocessor, power supply, first and second drive circuits as those shown in FIG. 4, which are not indicated. And a structure of the inverter 20 and a connection between the motor and the controllable bidirectional alternating current switch in each of the motor branches are the same as shown in FIG. 4. In the embodiment shown in FIG. 5, the switch control circuit C1 of the motor branch A1 includes an optical isolation bidirectional trigger diode (Diac) 60. The optical isolation bidirectional trigger diode 60 can include a light-emitting diode 61 and a bidirectional trigger diode 63. An anode of the light-emitting diode 61 is connected to a power supply Vdd via a resistor R16, and the power supply Vdd may be provided by the power supply 30. A cathode of the light-emitting diode 61 is grounded via a control switch 64. Two anodes of the bidirectional trigger diode 63 are connected to the first output terminal X of the inverter 20 and the control end of the controllable bidirectional alternating current switch S1, respectively. The control switch 64 receives the selection signal CTRL1 to control whether to turn on the controllable bidirectional alternating current switch S1 in the motor branch A1, thereby controlling whether to cause the motor M to operate.

Figure 6:
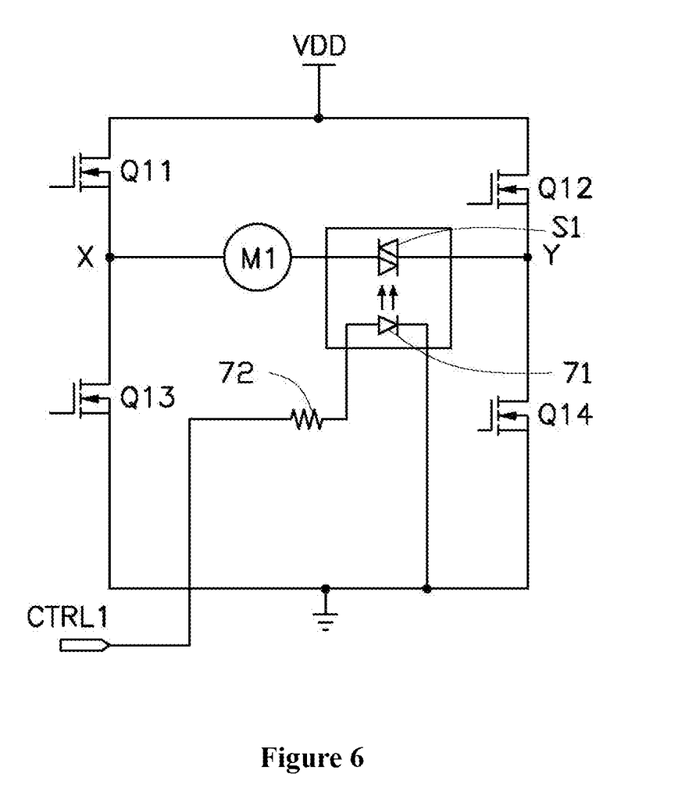
FIG. 6 shows circuit diagram of a motor driving device according to another embodiment.

FIG. 6 shows a circuit diagram of a motor driving device according to another embodiment. The switch control circuit C1 can include a light-emitting diode 71, and the controllable bidirectional alternating current switch S1 is a bidirectional trigger diode. An anode of the light-emitting diode 71 receives the selection signal CTRL1 via a resistor 72, and a cathode of the light-emitting diode 71 is grounded. The light-emitting diode 71 and the bidirectional trigger diode form an optical isolation bidirectional trigger diode. The optical isolation bidirectional trigger diode controls whether to cause the motor M1 in the motor branch A1 to operate based on a state of the selection signal CTRL1.

Figure 7:
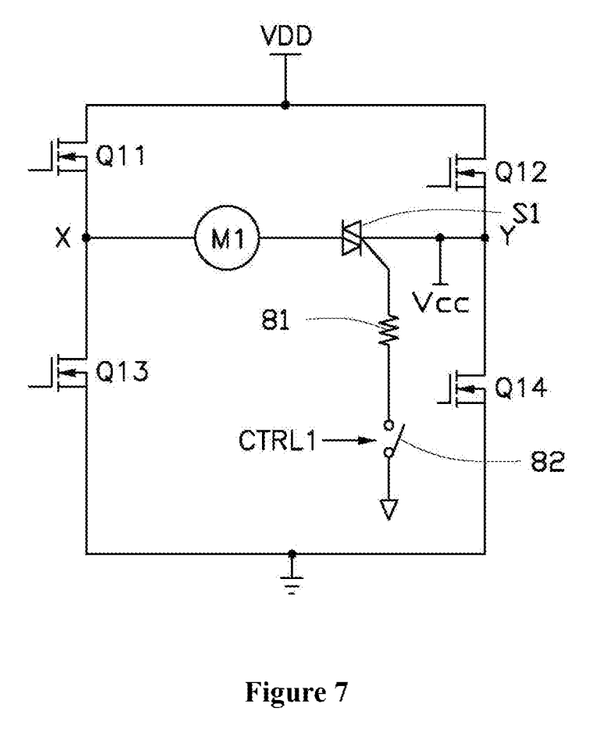
FIG. 7 shows circuit diagram of a motor driving device according to another embodiment.

FIG. 7 shows a circuit diagram of a motor driving device according to another embodiment. The switch control circuit C1 includes a resistor 81 and a control switch 82 connected in series between the control end of the controllable bidirectional alternating current switch S1 and the ground. The second output terminal Y is further connected to a power supply Vcc, the power supply Vcc is used to provide a gate drive current to the controllable bidirectional alternating current switch S1. The control switch 82 receives the selection signal CTRL1 to control the controllable bidirectional alternating current switch S1 in the motor branch A1, thereby controlling whether to cause the motor M to operate. In the embodiment, the control switch 82 may be a triode.

Figure 8:
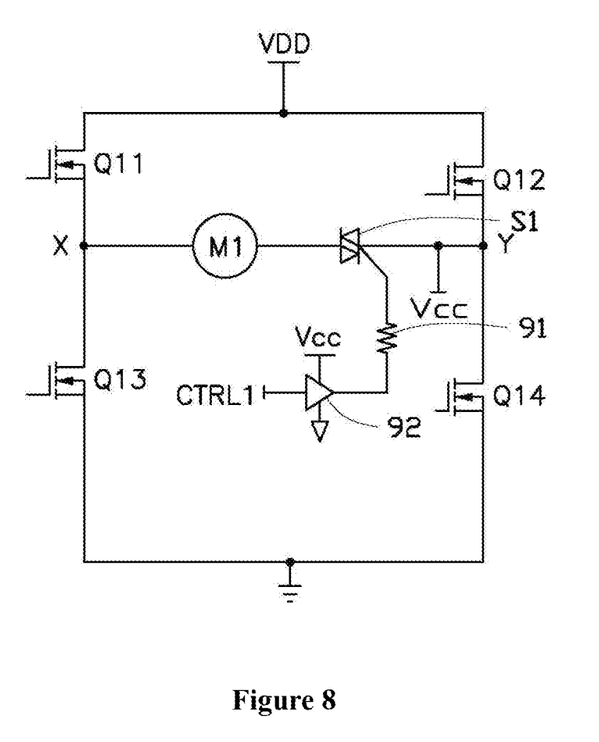
FIG. 8 shows circuit diagram of a motor driving device according to another embodiment.

FIG. 8 shows a circuit diagram of a motor driving device according to another embodiment. The switch control circuit C1 includes a resistor 91 and a signal buffer 92. An input end of the signal buffer 92 receives the selection signal CTRL1, and an output end of the signal buffer 92 is connected to the control end of the controllable bidirectional alternating current switch S1 via the resistor 91. The second output terminal Y is further connected to a power supply Vcc, the power supply Vcc is used to provide a gate drive current to the controllable bidirectional alternating current switch S1. The signal buffer 92 controls the controllable bidirectional alternating current switch S1 in the motor branch A1, thereby controlling whether to cause the motor M1 to operate.

The power supply Vcc and the power supply VDD in the above embodiments are independent from each other, and the two power supplies do not share a common ground.

Figure 9:
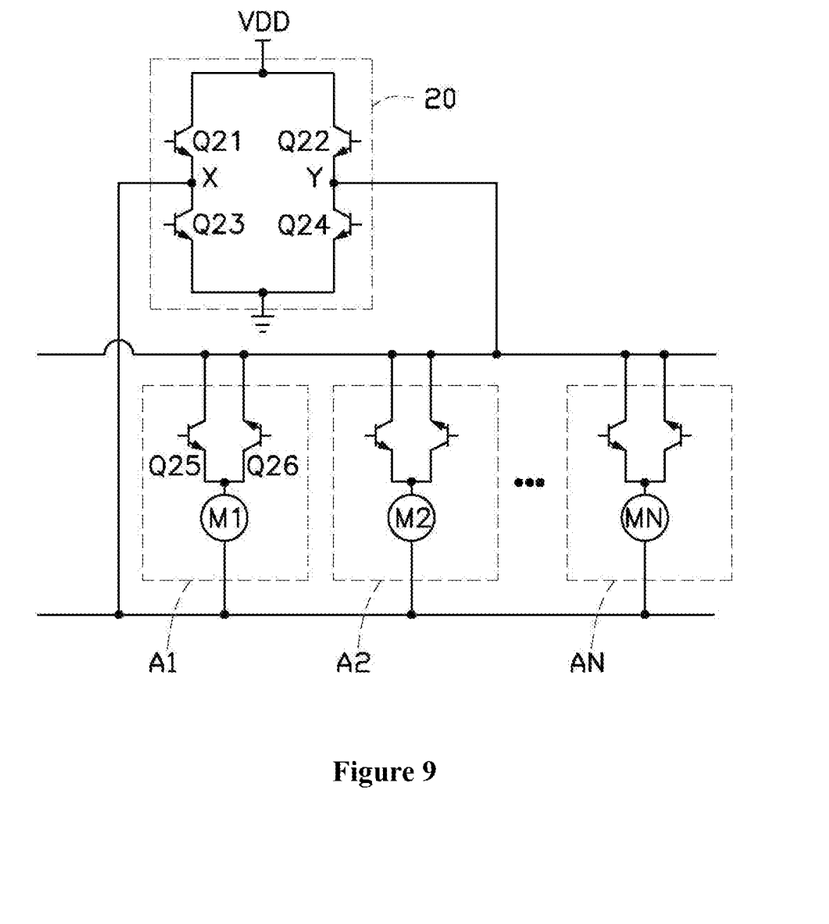
FIG. 9 shows circuit diagram of a motor driving device according to another embodiment.

FIG. 9 shows a circuit diagram of a motor driving device according to another embodiment. In the embodiment, the inverter 20 is a bridge circuit mainly including four triodes Q21 to Q24. The triodes Q21 and Q23 form a first bridge arm, the triodes Q22 and Q24 form a second bridge arm. The triodes Q21 and Q22 are upper arm switches, and the triodes Q23 and Q24 are lower arm switches. The microprocessor 10 sends a PWM signal to control triodes Q21 and Q24 and the triodes Q22 and Q23 to be turned on alternately, to supply the alternating current between the first output terminal X and the second output terminal Y. The controllable bidirectional alternating current switch in each of the motor branches A1 to AN is formed with anti-parallel triodes Q25 and Q26, the turn-on and turn-off of the triodes Q25 and Q26 are controlled by the microprocessor 10. Compared with a design using a triac, the anti-parallel triodes Q25 and Q26 are easy to control. Apparently, in other embodiments, the triodes Q25 and Q26 may be replaced with IGBT, GTR, MOS, GTO, or electronic switches of other types.

In summary, multiple motor branches of the motor driving device of the present disclosure may share one inverter, the number of the semiconductor switches can be greatly reduced compared with conventional technology, by 75% basically, and the size of the printed circuit board component where the semiconductor switches are mounted is reduced by 75% approximately. The motor driving device can have a simple structure with a low cost.

A motor driving device of the present disclosure can be applied to various devices to drive different loads. The motor driving device can drive multiple motors to operate alternately or simultaneously. The motor driving device can be applied to a dish-washing machine or a dry washer in household appliances, and applied to seat adjustment system in the vehicle.

What is described above is only preferable embodiments of the present disclosure and is not intended to define the scope of protection of the present disclosure. Any changes, equivalent substitution, improvement and so on made within the spirit and principles of the present disclosure are all contained in the scope of protection of the present disclosure.

The invention claimed is:

1. A motor driving device for a plurality of brushless direct current motors, comprising:
   an inverter having a plurality of semiconductor switches and outputting an alternating current power via a first output terminal and a second output terminal;
   a plurality of motor branches connected in parallel between the first output terminal and the second output terminal of the inverter, and each of the plurality of motor branches comprising a motor and a controllable bidirectional alternating current switch connected in series; and
   a microprocessor controlling a conduction manner of the semiconductor switches in the inverter, and controlling whether to turn of the controllable bidirectional alternating current switch in each of the plurality of motor branches.

2. The motor driving device of claim 1, wherein the inverter is a bridge inverter, and intermediate nodes of two single-phase bridge arms of the inverter serve as the first output terminal and the second output terminal of the inverter, respectively.

3. The motor driving device of claim 2, wherein each of the motor branches further comprises a switch control circuit, the switch control circuit receives a selection signal outputted by the microprocessor and used to control whether to turn on the controllable bidirectional alternating current switch.

4. The motor driving device of claim 3, wherein when the controllable bidirectional alternating current switch is turned on, the switch control circuit switches between at least a first state and a second state; and
   in the first state, a current flows from the first output terminal of the inverter to a control end of the controllable bidirectional alternating current switch through the switch control circuit, and then is grounded via the second output terminal and a turned-on lower arm semiconductor switch connected to the second output terminal in the inverter; and in the second state, a current flows from the second output terminal to the first output terminal of the inverter, through a control end of the bidirectional alternating current switch and the switch control circuit, and then is grounded via a turned-on lower arm semiconductor switch connected to the first output terminal in the inverter.

5. The motor driving device of claim 3, wherein the switch control circuit comprises a first switch and a second switch; and the first switch and the second switch are connected in parallel between the control end of the controllable bidirectional alternating current switch and the first output terminal of the inverter; when the first switch is turned on, a current flows from the first output terminal of the inverter to the control end of the controllable bidirectional alternating current switch through the first switch; and when the second switch is turned on, a current flows from the control end of the controllable bidirectional alternating current switch to the first output terminal of the inverter through the second switch.

6. The motor driving device of claim 3, wherein the switch control circuit comprises an optical isolation bidirectional trigger diode, the optical isolation bidirectional trigger diode comprises a light-emitting diode and a bidirectional trigger diode, an anode of the light-emitting diode is connected to a power supply, a cathode of the light-emitting diode is grounded via a control switch, two anodes of the bidirectional trigger diode are connected to the first output terminal of the inverter and the control end of the controllable bidirectional alternating current switch respectively, and the control switch receives a selection signal to control whether to turn on the controllable bidirectional alternating current switch in each of the motor branches.

7. The motor driving device of claim 1, wherein each of the motor branches further comprises a switch control circuit, the switch control circuit comprises a light-emitting diode, the controllable bidirectional alternating current switch is a bidirectional trigger diode, an anode of the light-emitting diode receives a selection signal for controlling whether to turn on the controllable bidirectional alternating current switch in each of the motor branches, a cathode of the light-emitting diode is grounded, and the light-emitting diode and the bidirectional trigger diode form an optical isolation bidirectional trigger diode.

8. The motor driving device of claim 1, wherein each of the motor branches further comprises a switch control circuit, the switch control circuit comprises a resistor and a control switch connected in series between a control end of the controllable bidirectional alternating current switch and the ground, the second output terminal is further connected to a power supply used to provide a gate drive current to the controllable bidirectional alternating current switch, and a selection signal is sent to the control switch to control whether to turn on the controllable bidirectional alternating current switch in each of the motor branches.

9. The motor driving device of claim 1, wherein each of the motor branches further comprises a switch control circuit, the switch control circuit comprises a resistor and a signal buffer, an input end of the signal buffer receives a selection signal outputted by the microprocessor and the controllable bidirectional alternating current switch is controlled whether to turn on by the selection signal in each of the motor branches, the second output terminal is further connected to a power supply used to provide a gate drive current to the controllable bidirectional alternating current switch, and an output end of the signal buffer is connected to a control end of the controllable bidirectional alternating current switch via the resistor.

10. The motor driving device of claim 1, wherein the controllable bidirectional alternating current switch is a TRIAC, anti-parallel IGBTs, GTRs, MOSs, GTOs or triodes, or a bidirectional silicon triode thyristor.

11. An application apparatus, comprising the motor driving device of claim 1 for a plurality of brushless direct current motors and loads driven by each of the motors.

12. The application apparatus of claim 11, wherein the application apparatus is a dish-washing machine, a dry washer, or a vehicle seat.

13. The application apparatus of claim 11, the inverter is a bridge inverter, and intermediate nodes of two single-phase bridge arms of the inverter serve as the first output terminal and the second output terminal of the inverter, respectively.

14. The application apparatus of claim 13, wherein each of the motor branches further comprises a switch control circuit, the switch control circuit receives a selection signal outputted by the microprocessor and used to control whether to turn on the controllable bidirectional alternating current switch.

15. The application apparatus of claim 14, wherein when the controllable bidirectional alternating current switch is turned on, the switch control circuit switches between at least a first state and a second state; and in the first state, a current flows from the first output terminal of the inverter to a control end of the controllable bidirectional alternating current switch through the switch control circuit, and then is grounded via the second output terminal and a turned-on lower arm semiconductor switch connected to the second output terminal in the inverter; and in the second state, a current flows from the second output terminal to the first output terminal of the inverter, through a control end of the bidirectional alternating current switch and the switch control circuit, and then is grounded via a turned-on lower arm semiconductor switch connected to the first output terminal in the inverter.

16. The application apparatus of claim 14, wherein the switch control circuit comprises a first switch and a second switch; and the first switch and the second switch are connected in parallel between the control end of the controllable bidirectional alternating current switch and the first output terminal of the inverter; when the first switch is turned on, a current flows from the first output terminal of the inverter to the control end of the controllable bidirectional alternating current switch through the first switch; and when the second switch is turned on, a current flows from the control end of the controllable bidirectional alternating current switch to the first output terminal of the inverter through the second switch.

17. The application apparatus of claim 14, wherein the switch control circuit comprises an optical isolation bidirectional trigger diode, the optical isolation bidirectional trigger diode comprises a light-emitting diode and a bidirectional trigger diode, an anode of the light-emitting diode is connected to a power supply, a cathode of the light-emitting diode is grounded via a control switch, two anodes of the bidirectional trigger diode are connected to the first output terminal of the inverter and the control end of the controllable bidirectional alternating current switch respectively, and the control switch receives a selection signal to control whether to turn on the controllable bidirectional alternating current switch in each of the motor branches.

18. The application apparatus of claim 14, wherein each of the motor branches further comprises a switch control circuit, the switch control circuit comprises a light-emitting diode, the controllable bidirectional alternating current switch is a bidirectional trigger diode, an anode of the light-emitting diode receives a selection signal for controlling whether to turn on the controllable bidirectional alternating current switch in each of the motor branches, a cathode of the light-emitting diode is grounded, and the light-emitting diode and the bidirectional trigger diode form an optical isolation bidirectional trigger diode.

19. The application apparatus of claim 1, wherein each of the motor branches further comprises a switch control circuit, the switch control circuit comprises a resistor and a control switch connected in series between a control end of the controllable bidirectional alternating current switch and the ground, the second output terminal is further connected to a power supply used to provide a gate drive current to the controllable bidirectional alternating current switch, and a selection signal is sent to the control switch to control whether to turn on the controllable bidirectional alternating current switch in each of the motor branches.

20. The application apparatus of claim 1, wherein each of the motor branches further comprises a switch control circuit, the switch control circuit comprises a resistor and a signal buffer, an input end of the signal buffer receives a selection signal outputted by the microprocessor and the controllable bidirectional alternating current switch is controlled whether to turn on by the selection signal in each of the motor branches, the second output terminal is further connected to a power supply used to provide a gate drive current to the controllable bidirectional alternating current switch, and an output end of the signal buffer is connected to a control end of the controllable bidirectional alternating current switch via the resistor.

* * * * *